June 10, 1958 S. A. CALDWELL 2,837,914
ACOUSTIC IMPEDANCE MEASURING APPARATUS
Filed Feb. 24, 1954

INVENTOR.
STEPHEN A. CALDWELL
BY Morris A. Rabken
ATTORNEY

United States Patent Office 2,837,914
Patented June 10, 1958

2,837,914

ACOUSTIC IMPEDANCE MEASURING APPARATUS

Stephen A. Caldwell, Haddon Heights, N. J., assignor, by mesne assignments, to the United States of America as represented by the Secretary of the Air Force Application February 24, 1954, Serial No. 412,360

5 Claims. (Cl. 73—67.1)

This invention relates to measurement of acoustical impedances, and, more particularly, to apparatus for measuring the acoustical impedance of materials.

In the normal course of work on electro-acoustical transducers and filters, the worker in this field often finds it helpful to know the values of the acoustical impedances of the elements with which he is working. Very often the calculation of acoustical impedance is impractical. This is especially true where the element is a metallic or cloth screen or an orifice of odd shape.

In many types of transducers, such as microphones and earphones, the high frequency response is often greatly affected by the damping material used in front of cavities acoustically associated with the transducer. Various damping materials of the same physical composition often do not have the same acoustical impedances.

Most of the methods of and apparatus for measuring acoustical impedance incorporate more or less elaborate equipment. The use of such equipment is relatively expensive and often inconvenient.

A relatively simple acoustical measuring device would, therefore, be of great utility in the acoustical art.

In accordance with this invention an unknown acoustical impedance of an article is compared with a known standard of acoustical impedance. Acoustical signals are first applied to the known standard of acoustical impedance. These acoustical signals are then translated into corresponding electrical signals. The amplitude and phase of the electrical signals are then noted by reading a suitable indicator, such, for example, as an electrical meter, to provide a reference level for comparison purposes. The article of unknown impedance is then substituted for the known standard of acoustical impedance. The amplitude and phase of the translated electrical signals are again measured. By comparing the relative phase and amplitude of the meter readings obtained when the unknown impedance is in the circuit with the readings obtained when the known impedance is in the circuit, the impedance of the unknown impedance may be determined.

It is an object of this invention to provide an improved apparatus for measuring the acoustical impedances of various materials.

It is a further object of this invention to provide apparatus for measuring impedance which may be readily assembled from available acoustical equipment.

Other objects and advantages of the present invention will become apparent and immediately suggest themselves to those skilled in the art to which the invention is directed from a reading of the following specification in connection with the accompanying drawing in which.

Figure 1:
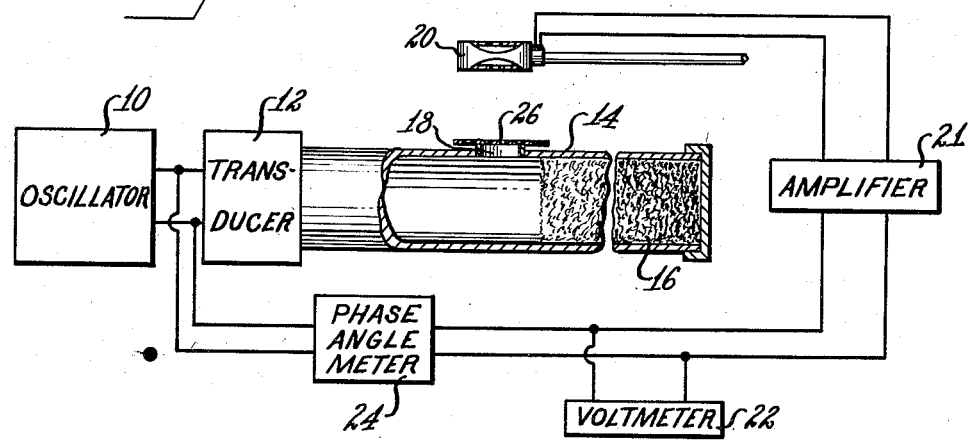
Figure 1 illustrates one form of equipment used for measuring impedances embodying the present invention.

Referring particularly to Figure 1, an audio oscillator 10 of any known type is connected to an electro-acoustical transducer 12. The latter is of any known type for converting an electrical signal to a corresponding acoustical signal. The transducer is tightly coupled to a relatively long tube 14, having sound absorbing material 16 distributed along its length to prevent the occurrence of standing waves.

The tube 14 provides a low impedance source of sound from which sound my be transmitted through an opening 18. A microphone 20 of any known type is disposed relatively close to the opening and is used to measure the pressure of the transmitted sound from the opening and to translate the sound into electrical signals. The voltage output from the microphone is first amplified by an amplifier 21 and then measured by a voltmeter 22 or other means for measuring the amplitude of the electrical signal. A phase angle meter 24 or other phase measuring means is used to measure the phase angle between the electrical signals from the microphone and the electrical signals of the oscillator, which are used as a reference.

In order to utilize this equipment for acoustical measurements, a known standard 26 of acoustical impedance is placed over the hole or opening 18. It is seen that under these conditions the voltmeter and the phase angle meter will show certain indications which may be used as standards for comparison purposes. It is also possible to use the opening itself as the known standard of acoustic impedance.

When the phase and voltage relationship has been established for a known acoustical impedance, articles of various impedance values may be placed over the opening. The indications on the voltmeter and the phase angle meter are then noted. The differences in phase angle and the voltage ratios resulting from the circuits including the known standard of acoustical impedance and the unknown impedance may then be utilized to determine the impedance of the article measured.

Figure 2:
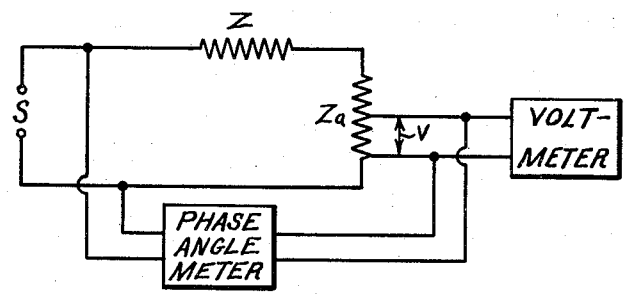
Figure 2 is an equivalent electrical circuit of part of the equipment shown in Figure 1.

Referring now particularly to Figure 2 of the drawing, S represents a low impedance source at the opening of the tube. Z represents the impedance to be measured. This impedance may be the known standard of acoustical impedance or the impedance of an article to be measured. $Z_a$ represents the air load on the impedance Z. $Z_a$ in this case is very much smaller than Z. V represents the voltage output from the microphone and is proportional to the magnitude of Z, since $Z_a$ is very much smaller than Z. It is noted that only a small portion of the voltage across $Z_a$ is measured by the voltmeter. This is due to the fact that only a portion of the air load comes in contact with the microphone. The symbol $\phi$ in the following discussion represents the phase difference between the pressure across Z and the particle velocity, which is analogous to the voltage and current in an electrical system. In this discussion and in the formulas to follow, the time delays resulting from the sound traveling from the distance between S and the microphone and other time delays within the system are the same for a given oscillation frequency when either the known standard of acoustic impedance or the unknown impedance is used in the circuit and, therefore, cancel out.

Referring to Fig. 1, if the known standard of acoustical impedance is first applied to the circuit, it is seen that $Z=Z_k$, $V=V_k$ and $\phi=\phi_1$, where $Z_k$ is the known impedance, $V_k$ is the voltage value with $Z_k$ and $\phi_1$ is a function of the phase angle existing between the pressure and particle velocity with $Z_k$. These values establish certain known relationships, with which comparisons may be made to determine the values of unknown impedances.

If an article of unknown impedance is placed over the opening, then $Z=Z_u$, where $Z_u$ is the unknown impedance value, $V=V_u$, where $V_u$ is the voltage output across the microphone with $Z_u$ in the circuit, and $\phi=\phi_2$, where $\phi_2$ is a function of the phase angle existing between the pressure and particle velocity with $Z_u$ in the circuit. The unknown impedance is found by substituting the know quantities and solving for $Z_u$. This is found by the formula:

$$Z_u = Z_k \frac{V_k}{V_u} /\phi_2 - \phi_1$$

This formula defines the unknown in terms of magnitude and phase angle.

It is seen from Figure 1 that the oscillator output may be used to produce a phase angle reference. This is due to the fact that the source impedance at the aperture is low compared to that of the element being tested. An experimental investigation of the pressure and phase in the vicinity of the aperture showed that there were only slight variations for wide ranges of sample impedances. From this reference angle, the phase angles resulting when the known and unknown impedances are used in the circuit, may be measured.

Figure 3:
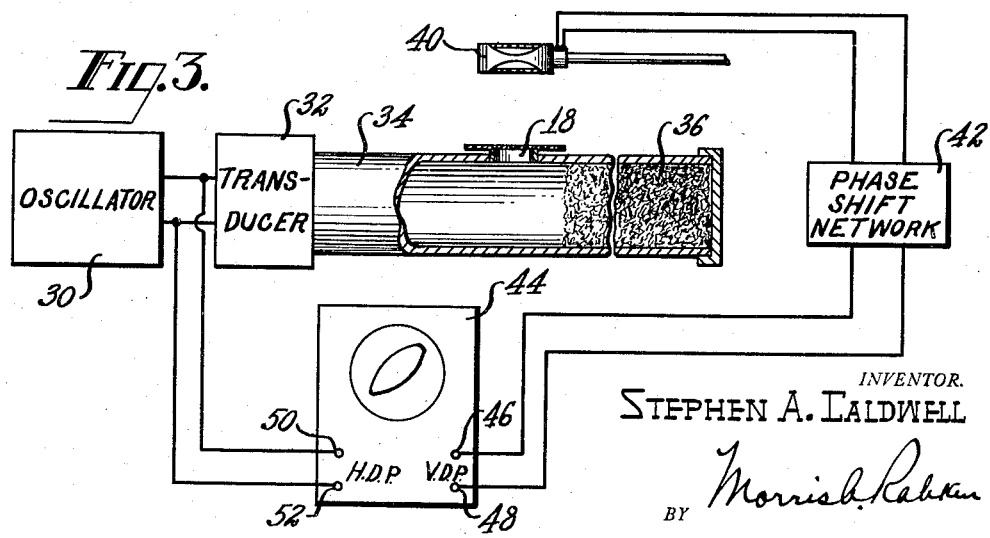
Figure 3 is another form of equipment embodying the present invention.

Referring particularly to Figure 3 of the drawing, there is shown another embodiment of the invention. An audio oscillator 30 is connected to an electro-acoustical transducer 32. Elements 30 and 32 may be the same as or similar to elements 10 and 12, respectively. The transducer is coupled to a pipe 34, having sound absorbing material 36. Elements 34 and 36 may also be the same as or similar to corresponding elements in Figure 1.

As was the case in the embodiment shown in Figure 1, the pipe or tube constitutes a low impedance source of sound from which sound may be transmitted through an opening 18. A microphone 40 like the microphone 20 translates the acoustical signal into a corresponding electrical signal. A phase shifter network 42 of any known kind is connected across the output of the microphone 40. The output from the phase shifter is applied to the pair of vertical deflection plates of an oscilloscope 44 through a pair of input terminals 46 and 48.

The output from the oscillator is applied directly to the horizontal deflection plates of the oscilloscope through the input terminals 50 and 52. The output from the oscillator is used to determine the phase angle reference. With the known value of impedance in the circuit, the Lissajous' pattern on the oscilloscope may be used and the phase shifting network adjusted to indicate a straight line. This straight line indicates that the phase of the voltage in the circuit including the known impedance is the same as the voltage of the oscillator. When the output voltage from the phase shifter, with the unknown impedance is applied to the oscilloscope, it will be out of phase with the voltage from the oscillator and the pattern on the oscilloscope will be varied from a straight line to an ellipse shape. The calibrations on the oscilloscope may then be used to give the difference in value between the voltages across the microphone and the phase difference of the voltages when the known standard of acoustical impedance is placed across the opening and when the material of unknown impedances is placed across the opening.

The ratios of the voltages and differences in phase angles may then be used to determine the value of an unknown impedance by direct comparison with certain known values, as described above.

What is claimed is:

1. A device for measuring acoustical impedance comprising means for generating sound, means coupled to said sound generating means for guiding said sound generated thereby, said sound guiding means including means for passing said sound through individual ones of a pair of elements for measuring the acoustical impedance of one of said elements, the acoustical impedance of said one element being unknown, the acoustical impedance of the other of said elements being known, said last-mentioned means providing a source of sound for measuring the acoustical impedance of said element of unknown impedance, the acoustical impedance of said source of sound being low with respect to the acoustical impedance of said elements, means spaced from said source along the path of said sound through said elements responsive to sound from said source for measuring the amplitude of sound from said source, said elements being adapted to be placed individually and successively in the path of said sound from said source to which said last-named means is responsive, means coupled to said last-named means and said sound generating means for measuring the phase shift imposed on said sound generated by said generating means upon passage through said source of sound and the one of said elements placed in said path.

2. A device for measuring acoustical impedance comprising an electro-acoustical transducer, an electrical signal providing means connected to said electro-acoustical transducer for actuating said transducer, means coupled to said electro-acoustical transducer for guiding the sound produced thereby to provide a sound source for individual ones of a pair of elements for measuring the acoustical impedance of one thereof, the acoustical impedance of the other of said elements being known, said sound source having an acoustical impedance relatively low with respect to the acoustical impedance of said elements, an audio-electrical transducer, said audio-electrical transducer being disposed in the path of sound waves from said source for translating said sound waves into a first group of electrical signals after the passage of said waves through said element of known acoustical impedance when said element of known acoustical impedance is disposed in said path and for translating said waves into a second group of electrical signals after the passage of said waves through said element of unknown acoustical impedance when said element of unknown acoustical impedance is disposed in said path, a measuring means connected to said audio-electrical transducer for determining the amplitude of said electrical signals, and phase comparing means connected between said electro-acoustical transducer and said audio-electrical transducer for determining the difference in phase between said electrical signals provided to said audio-electrical transducer and said electrical signals provided to said electro-acoustical transducer whereby the difference in phase between said electrical signals of said first group and said electrical signals of said second group is determinable.

3. A device for measuring acoustical impedance of an element having an unknown acoustical impedance by reference to the known acoustical impedance of another element, said device comprising an electro-acoustical transducer, an electrical signal providing means for actuating said electro-acoustical transducer, means coupled to said electro-acoustical transducer for guiding the sound produced thereby to provide a sound source for said elements for measuring the acoustical impedance of said element of unknown acoustical impedance, said sound source having an acoustical impedance relatively low with respect to the acoustical impedance of said elements, an audio-electrical transducer being disposed in the path of sound waves from said source for translating said sound waves into electrical signals, only one of said elements being disposed at the same time in said path, a first group of said electrical signals being produced by said audio-electrical transducer when said element of known acoustical impedance is disposed in said path and a second group of said electrical signals being produced when said element of unknown acoustical impedance is disposed in said path, an oscilloscope having two pairs of deflection plates, said electrical signal providing means being connected to one of said pairs of deflection plates, a phase shift network, said audio-electrical transducer being connected to the other of said pairs of deflection plates through said phase shift network whereby said oscilloscope indicates the amplitude of said sound waves passed through the different ones of said elements and the phase of said sound waves passing through different ones of said elements with respect to the phase of the actuating signal provided to said electro-acoustical transducer so that the difference in phase between said sound waves producing said first group of electrical signals and said sound waves producing said second group of electrical signals is determinable.

4. A device for measuring the acoustical impedance of an article comprising a tube, an electro-acoustical transducer coupled to said tube, an electrical signal providing means connected to said electro-acoustical transducer, said tube being formed with an aperture having a known acoustical impedance, said tube having an acoustical impedance relatively low with respect to the acoustical impedance of said article and with respect to the acoustical impedance of said aperture, an audio-electrical transducer being disposed in the path of sound waves issuing from said aperture, said article being positionable between said audio-electrical transducer and said aperture so that said sound waves from said aperture pass therethrough, means connected to said audio-electrical transducer for measuring the amplitude of sound waves issuing from said aperture which pass directly to said audio-electrical transducer when said article is removed from between said aperture and said transducer and which pass through said article when said article is positioned therebetween, and means connected to said means providing electrical signals to said electro-acoustical transducer and to said audio-electrical transducer for measuring the difference between the phase of said signals provided to said electro-acoustical transducer and by said audio-electrical transducer.

5. A device for measuring the acoustical impedance of an article comprising means for providing a sound source, said means including an electro-acoustical transducer, an electrical signal providing means connected to said electro-acoustical transducer and a tube formed with an aperture having a known acoustical impedance, said tube being coupled to said transducer and having an acoustical impedance relatively low with respect to said article and with respect to said aperture, said article being positionable over said aperture, a microphone disposed in the path of sound waves issuing from said aperture, a voltmeter connected to the output of said microphone to measure the amplitude of sound waves passing through said aperture when said article is removed from over said aperture and the amplitude of sound waves passing through said article when said article is in position over said aperture, a phase angle meter connected between said means providing electrical signals to said electro-acoustical transducer and the output from said microphone whereby the difference in phase between sound waves passed through said aperture and through said article will be indicated upon comparison of the measured phase shift when said article is positioned over said aperture and when said article is removed from over said aperture.

References Cited in the file of this patent

UNITED STATES PATENTS

| | | |
|---|---|---|
| 1,743,414 | Wente | Jan. 14, 1930 |
| 1,795,647 | Flanders | Mar. 10, 1931 |
| 2,618,968 | McConnell | Nov. 25, 1952 |
| 2,666,326 | Poole et al. | Jan. 19, 1954 |